United States Patent [19]

Bertsch et al.

[11] Patent Number: 4,905,531

[45] Date of Patent: Mar. 6, 1990

[54] ADJUSTING DRIVE

[75] Inventors: Hans Bertsch, Lichtenau; Jacob Stolle; Michael Winzer, both of Bühlertal, all of Fed. Rep. of Germany

[73] Assignee: Robert Bosch GmbH, Stuttgart, Fed. Rep. of Germany

[21] Appl. No.: 300,061

[22] Filed: Jan. 23, 1989

[30] Foreign Application Priority Data

Feb. 11, 1988 [DE] Fed. Rep. of Germany ....... 3804219

[51] Int. Cl.$^4$ .............................................. F16C 32/00
[52] U.S. Cl. .................................. 74/424.7; 384/303; 384/440
[58] Field of Search ............................ 74/424.7, 424.6; 384/285, 283, 284, 282, 303, 440, 316, 300

[56] References Cited

U.S. PATENT DOCUMENTS 2,699,364 1/1955 Schmidlin ..................... 384/303 X
2,730,369 1/1956 Steed ............................. 74/424.7 X
4,314,732 2/1982 Murphy ......................... 384/440 X Primary Examiner—James T. McCall
Attorney, Agent, or Firm—Michael J. Striker

[57] ABSTRACT

An adjusting drive comprises an electric motor having a motor armature provided with a motor armature shaft, a worm transmission associated with the drive motor and having a worm shaft which is formed as a floatingly arranged extension of the motor armature shaft, the worm shaft having a free end provided with a convex end surface, a stationary running element on which the motor armature shaft is fixed in an axial direction when it is rotated in a rotary direction, so that a pitch angle of the worm shaft in connection with a flank angle of teeth of the worm shaft produce a load component extending transversely to a longitudinal axis of the worm shaft, the running element which cooperates with the convex end surface of the worm shaft having a running surface which is formed spatially relative to the longitudinal axis of the worm wheel so that it is inclined in direction of the loading component of the worm shaft.

6 Claims, 1 Drawing Sheet

ADJUSTING DRIVE

BACKGROUND OF THE INVENTION

The present invention relates to an adjusting drive, and particularly to an adjusting drive with a drive motor and a worm transmission with a worm shaft formed on an extension of a motor armature shaft.

Adjusting drives of the above mentioned general type are known in the art. In a known adjusting drive a spherical running mushroom of a transmission shaft runs over a housing wall of the drive, which housing wall extends substantially at a right angle relative to the rotary axis of the transmission shaft. When the transmission shaft is rotated in the rotary direction under the action of full load so that the axial displacement applied to it is directed toward the housing wall, the pitch angle of the worm shaft in connection with the flank angle of the teeth of the worm shaft and the teeth of the worm wheel causes a load component which is directed transverse to the longitudinal axis of the worm shaft. This load component leads to a deviation of the worm shaft which results in changing the engaging condition in the worm transmission and thereby the driving characteristic of the adjusting drive in an undesirable manner.

SUMMARY OF THE INVENTION

Accordingly, it is an object of the present invention to provide an adjusting drive which avoids the disadvantages of the prior art.

In keeping with these objects and with others which will become apparent hereinafter, one feature of the present invention resides, briefly stated, in an adjusting drive in which running on element cooperating with a curved end of a worm shaft of a worm transmission has a running surface which is formed spatially to a longitudinal axis of a worm wheel so that it is inclined in direction of a loading component of the worm wheel.

When the adjusting drive is designed in accordance with these features the above mentioned running on surface at least considerably reduces a deviation of the worm wheel under load and thereby significantly reduces a characteristic dissipation band of the adjusting drive.

In accordance with another feature of the present invention, the above mentioned running surface of the running element is curved in a concave manner.

Still a further feature of the present invention is that the running surface is provided on a separate structural element which is mounted on a housing part of the adjusting drive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
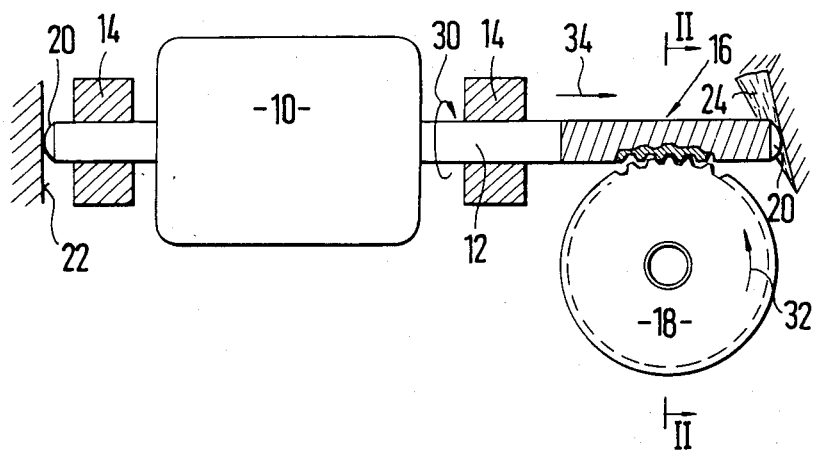
FIG. 1 is a view showing a motor armature with a worm transmission of an adjusting drive in accordance with the present invention.

An adjusting drive, for example for adjusting seats in power vehicles, has an electrical drive motor with a reversible direction of rotation, of which a motor armature is shown in the drawings and identified with reference numeral 10. The motor armature 10 has an armature shaft 12 extending outwardly beyond both sides of the armature pack and is supported by bearing elements 14. The armature shaft 12 has an extension 16 extending through the right bearing element 14 in the drawings and provided with a plurality of worm teeth. The extension 16 thereby forms a worm shaft which engages with a worm wheel 18. The worm wheel 1 is in an operative connection with a not shown vehicle seat to be adjusted.

As can be seen particularly from FIG. 1, the worm shaft 16 is supported in a floating manner. In other words, its end which is spaced from the motor armature 10 is arranged without any support. Both ends of the composite shaft 12, 16 are provided with a convex curvature 20 associated with running on surfaces 22 and 24. The running surfaces 22 and 24 must absorb the axial displacement of the shaft 12, 16 which is applied in the adjusting drive operating under load to the motor armature or the shaft 12, 16.

Figure 2:
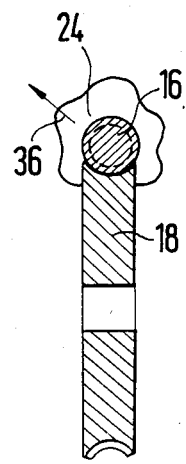
FIG. 2 is a view showing a section of the worm transmission taken along the line II-II in FIG. 1 and on an enlarged scale.

The running surface 22 extends substantially in a plane which forms a right angle with the longitudinal axis of the shaft 12 16 and is located near the left bearing element 14. This situation is however different on the opposite side of the shaft 12, 16 in the region, of the worm transmission. When the drive motor rotates the worm shaft 16 in direction of the arrow 30 and the worm wheel 18 is driven therefore in direction of the arrow 32, the worm transmission 16, 18 exerts an axial displacement in direction of the arrow 34 upon the shaft 12, 16, which presses the shaft against the running surface 24. The axial force in the adjusting drive operating in condition of full load can be so high that the shaft 12, 16 in the region of the floatingly supported worm shaft 16 can elastically deviate by a load component identified in FIG. 2 by the arrow 36 in direction of this arrow. This undesired deviation can change the engaging condition of the worm transmission 16, 18 in an undesirable manner, since it will change the characteristic of the adjusting drive.

The above described disadvantage is eliminated in the adjusting drive in accordance with the present invention in that the running surface 24 which cooperates with the curvature 20 of the worm shaft 16 is spatially formed so that it is inclined in direction of the load component 36 of the worm shaft. The greater is the load component 36 which could cause the deviation of the worm shaft 16, the stronger is the worm shaft 16 held against the worm sheel 18 because of the inclination of the running surface 24 in its initial engaging position. A deviation of the shaft 12, 16 can occur only within the region of the total longitudinal play of the shaft between both running on surfaces 22 and 24.

It is recommended that the running on surface 24 is formed on a separate structural element which is fixed on a housing part of the adjusting drive. It is also possible that the running surface 24 is formed directly on the housing part. Furthermore, it is possible that the running surface 24 is formed as a flat running surface which is spatially inclined to the longitudinal surface of the armature shaft, and also as a running surface which can be concavely curved.

It will be understood that each of the elements described above, or two or more together, may also find a useful application in other types of constructions differing from the types described above.

While the invention has been illustrated and described as embodied in an adjusting drive with a drive motor and an associated worm drive it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An adjusting drive, comprising an electric motor having a motor armature provided with a motor armature shaft; a worm transmission associated with said drive motor and having a worm wheel and a worm shaft which is formed as a floatingly arranged extension of said motor armature shaft, said worm shaft having a free end provided with a convex end surface; a stationary running element against which said motor armature shaft abuts in an axial direction when it is rotated in a rotary direction, so that a pitch angle of said worm shaft in connection with a flank angle of teeth of said worm shaft produce a loading component acting transversely to a longitudinal axis of said worm shaft in a predetermined direction, said running element which cooperates with said convex end surface of said worm shaft having a running surface which is formed spatially relative to said longitudinal axis of said worm shaft so that it is inclined in the predetermined direction of action of said loading component of said worm shaft.

2. An adjusting drive as defined in claim 1, wherein said drive motor is formed as an electric drive motor with a reversible direction of rotation.

3. An adjusting drive as defined in claim 1, wherein said worm transmission has a worm wheel which engages with said worm shaft.

4. An adjusting drive as defined in claim 1, wherein said running surface is curved in a concave manner.

5. An adjusting drive as defined in claim 1; and further comprising a housing part, said running surface is formed as a separate element which is fixed on said housing part.

6. An adjusting drive as defined in claim 1; and further comprising a housing part, said running surface being formed on said housing part.

* * * * *